United States Patent
Reynolds (10) Patent No.: US 9,606,714 B2
(45) Date of Patent: Mar. 28, 2017

(54) TERMINAL, METHOD AND COMPUTER PROGRAM PRODUCT FOR INTERACTING WITH A PHYSICAL ENTITY

(75) Inventor: Franklin Reynolds, Bedford, MA (US)

(73) Assignee: Nokia Technologies Oy, Espoo (FI)

( * ) Notice: Subject to any disclaimer, the term of this patent is extended or adjusted under 35 U.S.C. 154(b) by 1535 days.

(21) Appl. No.: 10/738,530

(22) Filed: Dec. 17, 2003

(65) Prior Publication Data

US 2005/0138630 A1    Jun. 23, 2005

(51) Int. Cl.
| | | |
|---|---|---|
| G06F 3/0486 | (2013.01) | |
| G06F 3/0346 | (2013.01) | |
| G06F 3/038 | (2013.01) | |
| G06K 7/00 | (2006.01) | |
| G06K 19/077 | (2006.01) | |
| H04M 1/725 | (2006.01) | |
| H04W 40/24 | (2009.01) | |

(52) U.S. Cl.
CPC .......... *G06F 3/0486* (2013.01); *G06F 3/0346* (2013.01); *G06F 3/0383* (2013.01); *G06K 7/0008* (2013.01); *G06K 19/07758* (2013.01); *H04M 1/7253* (2013.01); *H04W 40/246* (2013.01)

(58) Field of Classification Search
USPC ........................................................ 345/156
See application file for complete search history.

(56) References Cited

U.S. PATENT DOCUMENTS

| | | |
|---|---|---|
| 6,614,351 B2 | 9/2003 | Mann et al. |
| 6,643,721 B1 | 11/2003 | Sun |
| 2002/0135515 A1 | 9/2002 | Rankin et al. |
| 2002/0144007 A1 | 10/2002 | Shteyn |
| 2002/0184332 A1 | 12/2002 | Kindberg et al. |
| 2003/0036425 A1* | 2/2003 | Kaminkow et al. ............ 463/25 |
| 2003/0136837 A1* | 7/2003 | Amon et al. .................. 235/435 |

(Continued)

FOREIGN PATENT DOCUMENTS

| | | |
|---|---|---|
| EP | 1 244 043 A2 | 9/2002 |
| WO | WO/02/13556 A2 | 2/2002 |
| WO | WO 02/15601 A2 | 2/2002 |

OTHER PUBLICATIONS

Hans-W. Gellersen, Albrecht Schmidt, Michael Biegl; *Adding Some Smartness to Devices and Everyday Things*; 8 pages.

(Continued)

*Primary Examiner* — Alexander Eisen
*Assistant Examiner* — Cory Almeida
(74) *Attorney, Agent, or Firm* — Alston & Bird LLP (57) ABSTRACT

A terminal for interacting with a physical entity includes a controller capable of selecting a physical entity, and thereafter receiving data from the entity at a terminal at least partially over an air interface. The controller can also identify a type of the entity based upon the data. Thereafter, the controller can be capable of performing at least one action based upon the entity type, an application operating on the terminal and a selection event. The application can comprise any of a number of applications, such as an application associated with the type of entity or an alternative application other than the associated application. Likewise, the selection event can comprise any of a number of different predefined events, such as "select and get information," "select and open," and/or "select drag and drop."

16 Claims, 3 Drawing Sheets

(56) References Cited

U.S. PATENT DOCUMENTS

| | | | |
|---|---|---|---|
| 2003/0154293 A1* | 8/2003 | Zmolek | H04L 63/08 709/228 |
| 2003/0155413 A1* | 8/2003 | Kovesdi et al. | 235/375 |
| 2004/0002305 A1 | 1/2004 | Byman-Kivivuori et al. | |

OTHER PUBLICATIONS

Michael Beigl, Tobias Zimmer, Albert Krohn, Christian Decker, Philip Robinson; *Smart-Its—Communication and Sensing Technology for UbiComp Environments*; 10 pages.

Diomidis Spinellis; *Palmtop Programmable Appliance Controls*; 7 pages.

Michael Beigl; *Using spatial Co-location for Coordination in Ubiquitous Computing Environments*; 15 pages.

Frank Siegemund; *Spontaneous Interaction using Mobile Phones and Short Text Messages*; 6 pages; available at <http://citeseer.nj.nec.com/540959.html> (visited Sep. 15, 2003).

Michael Beigl; *Point & Click—Interaction in Smart Environments*; 3 pages.

Matthias Ringwald; *Spontaneous Interaction with Everyday Devices Using a PDA*; 6 pages.

Albrecht Schmidt, Hans-W. Gellersen, Michael Beigl, Ortwin Thate; *Developing User Interfaces for Wearable Computers—Don't Stop to Point and Click*; 4 pages.

Lars Erik Holmquist, Friedemann Mattern, Bernt Schiele, Petteri Alahuhta, Michael Beigl, Hans-W. Gellersen; *Smart-Its Friends: A Technique for Users to Easily Establish Connections between Smart Artefacts*; 2001; 6 pages.

Michael Biegl; Hans Gellersen; *Smart-Its: An embedded Platform for Smart Objects*; 4 pages.

Tim Kindberg, John Barton, Jeff Morgan, Gene Becker, Debbie Caswell, Philippe Debaty, Gita Gopal, Marcos Frid, Venky Krishnan, Howard Morris, John Schettino, Bill Serra; *People, Places, Things: Web Presence for the Real World*; 14 pages; available at <http://www.cooltown.com/dev/wpapers/webpres/WebPresence> (visited Sep. 5, 2003).

Tim Kindberg; *Ubiquitous and contextual identifier resolution for the real-world wide web*; 13 pages; available at <http://www.cooltown.com/dev/wpapers/idresolution/idresolution.pdf>.

\* cited by examiner

TERMINAL, METHOD AND COMPUTER PROGRAM PRODUCT FOR INTERACTING WITH A PHYSICAL ENTITY

FIELD OF THE INVENTION

The present invention generally relates to systems and methods of interacting with entities and, more particularly, relates to terminals, methods and computer program products for interacting with entities to perform an action based upon a type of the entity.

BACKGROUND OF THE INVENTION

Computer science researchers have been exploring ideas associated with "smart spaces" or ubiquitous computing for years. One of the most important challenges has been creating new, intuitive user interfaces that are suitable for ubiquitous computing applications, but are not based on traditional personal computing platforms. The challenge is to make these new devices and applications simple and intuitive to use. Donald Norman describes some of the challenges in designing such a user interface in the book, THE INVISIBLE COMPUTER.

Many conventional computing systems, such as desktop and laptop computing systems, are capable of presenting a Graphical User Interface (GUI) that can be navigated using a pointing device, such as a mouse, trackball, touchpad, touch screen. In this regard, the pointing device can be utilized to point to an object presented on a display screen, and to select one or more actions to perform based upon that object. For example, many pointing devices include two buttons, a left button and a right button, for selecting action(s) to take based upon an object pointed to by the pointing device. For example, in Microsoft Windows operating systems, the left button can be clicked once to "select" an object and provide an indication that the object has been selected. Then, the next click (or two clicks in succession) on the object causes an action to be performed based upon the selected object. In Windows operating systems, for example, the next click can cause the computing system to initiate an application associated with the object. On the other hand, the right button typically provides one or more less-frequently utilized capabilities. For example, after selecting an object, the right button can be clicked to, among other things, view properties (e.g., the application) associated with the object.

In an attempt to address the design challenges of user interfaces suitable for ubiquitous computing applications, there has been significant work in the area of point-and-click user interfaces and the application of point-and-click ideas to ubiquitous computing research. Traditional infrared (IR) remote controls are an obvious example. In this regard, IR remote controls are being developed today to allow users to control a number of different entities from a single controller. Another example of the application of point-and-click ideas to ubiquitous computing research is the "Cooltown" research project within Hewlett-Packard Laboratories. Generally, in accordance with the Cooltown research project, users can interact with entities using wireless communication devices to execute uniform resource locators (URLs) to web resources such that the wireless communication device can thereafter interact with the web resources.

Whereas previous real-world point-and-click techniques allow users to interact with entities in a predetermined manner, such as to control the entity or link to web resources, such techniques are inflexible. In this regard, most systems employing such techniques are single purpose devices. For example, Cooltown uses IR to achieve limited, multi-application, point and click functionality. Cooltown protocols are used to send and receive URLs and these URLs are assumed to point to HTML documents. Cooltown can be thought of as a sort of real-world, web browsing system. The flexibility of this approach is limited because it is based on URLs that only point to web resources. It is very rare that a single reader can be used to read different tags associated with different applications. In some cases, such as laptop computers, IR can be used for multiple purposes (e.g., controlling peripheral devices, receiving data, etc.), but such applications typically do not involve point-and-click techniques to select entities with which the laptop computers interact.

SUMMARY OF THE INVENTION

In light of the foregoing background, embodiments of the present invention provide an improved terminal, method and computer program product for interacting with physical entities. Embodiments of the present invention create a "point-and-click" style of user interface for ubiquitous computing applications that is based on the use of a terminal, such as a mobile station or portable digital assistant (PDA), and meta-data that is associated with each physical entity. Conventional computing systems, such as those explained above in the background section, can provide different types of pointing devices, with each being capable of creating the same types of selection events. In accordance with embodiments of the present invention, terminals can also include one or more different types of pointing devices or means, with each being capable of creating the same types of selection events. Generally, embodiments of the present invention permit terminal users to use a terminal to select real-world, physical entities and retrieve entity type information (e.g., metadata) associated with the real-world entity.

Upon retrieving the entity type information, the information can be utilized by the terminal to perform one or more actions based upon the entity type of the selected entity, an application operating on the terminal, and a selection event. In this regard, the entity type information can be used by an application currently operating on the terminal to perform predefined action(s) based upon the selected entity. For example, in accordance with embodiments of the present invention, a terminal operating a service or application browsing application can select a physical entity, and based upon the entity, open appropriate application(s) on the terminal via a "point-and-click" user interface. In contrast to conventional techniques, embodiments of the present invention allow the terminal to perform different predefined actions, such as executing different applications, by selecting different entities. For example, embodiments of the present invention allow the terminal to execute different applications by selecting different entities. Also, for example, embodiments of the present invention allow the terminal to access content from a network entity into an application, such as a conventional Web browser, by selecting different entities.

According to one aspect of the present invention, a terminal is provided for interacting with a physical entity. The terminal includes a controller capable of selecting a physical entity, and thereafter receiving data from the entity at least partially over an air interface. The controller can also identify a type of the entity based upon the data. Thereafter, the controller can be capable of performing at least one action based upon the entity type, an application operating on the terminal and a selection event. More particularly, the type of entity typically has an associated application. Thus, the controller can be capable of executing, on the terminal, the application associated with the entity type when the application operating on the terminal comprises an application launcher, such as when the selection event comprises one of"select and open." Further, when the selection event comprises "select and open," for example, in addition to operating an application associated with the event type, the controller can send and/or receive information relating to the entity.\

In various instances, the selection event can comprise, for example, "select and get information." In such instances, the controller can be capable of determining a listing of at least one action based upon the entity type. Thereafter, the controller can receive a selection of an action from the listing. The controller can then be capable of performing the selected action based upon the application operating on the terminal and the selection event.

In various other instances, the selection event can comprise, for example, "select drag and drop." In such instances, the controller can be capable of executing an alternative application other than the application associated with the type of entity, and thereafter operating the alternative application to send and/or receive information relating to the entity. The controller can further be capable of selecting the alternative application or a second entity associated with the alternative application. And when the controller selects the second entity, the controller can also receive data from the second entity, identify a type of the second entity based upon the data, and identify the alternative application based upon the entity type of the second entity.

The terminal can also include a memory capable of storing content associated with an application. In such instances the type of the selected entity can be associated with an application comprising an alternative application other than the application associated with the content. Thus, in another instance when the selection event comprises "select drag and drop," for example, the controller can be further capable of executing and operating the alternative application to receive the selected content.

A method and computer program product for interacting with a physical entity are also provided. Embodiments of the present invention therefore provide a terminal, method and computer program product for interacting with entities that, in contrast to conventional computing systems, allow the terminal to perform different predefined actions, such as executing different applications, by selecting different entities. As explained below, embodiments of the present invention can facilitate performing different actions by associating a type of entity with real-world, physical entities, and associating different applications with the different types of entities. Embodiments of the present invention therefore facilitate creation of real-world, point-and-click behavior that can mimic graphical user interface use techniques such as: "select-and-get-information," "select-and-open," and/or "select-drag-and-drop." As such, the terminal, method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
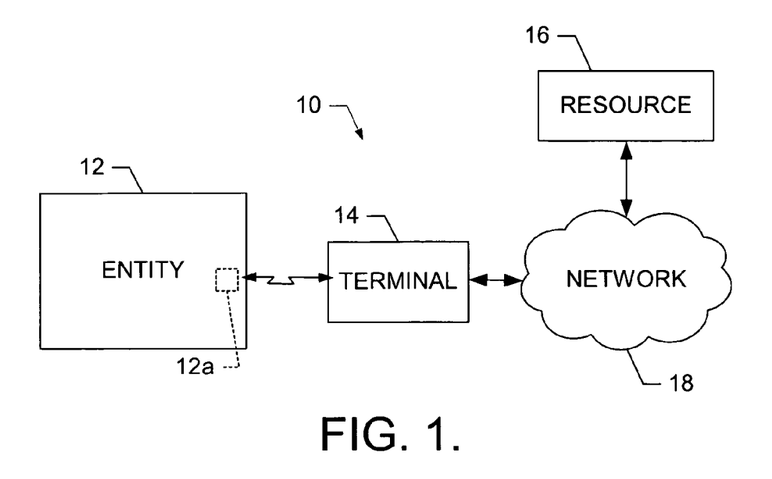
FIG. 1 is a block diagram of a system for interacting with a physical entity according to one embodiment of the present invention.

Referring to FIG. 1, according to one aspect of the present invention, a system 10 is provided for interacting with a physical entity 12. The system includes at least one terminal 14 capable of interacting with the entity to receive data from the entity to perform an action on the terminal based upon the data, such as executing an application on the terminal and receiving information regarding the entity into the application. To facilitate the terminal in receiving data from the entity, the system can also include a resource 16 in electrical communication with the terminal, such as via a network 16. The network can comprise any of a number of different types of networks, such as a local area network (LAN), a metropolitan area network (MAN) or a wide area network (WAN) like the Internet.

The entity 12 can comprise any of a number of different physical entities that may be of interest to a user to select to thereby perform an action. For example, the entity can comprise a physical thing such as a commercial product, painting or any of a number of other things a user may desire select to thereby perform an action such as executing an application on the terminal and receiving information regarding the entity into the application. Also, for example, the entity can comprise a physical thing such as a printer, television, door lock or any of a number of other things a user may desire to select to thereby perform an action such as executing an application on the terminal to actuate the selected entity or another entity to perform an action. Generally, then, the entity can comprise any of a number of different computers or other computational devices, electronic components, communication devices or computer peripherals, as well as books, publications, paintings, maps, facilities in a building, consumer goods or any other like objects, things, or items.

To facilitate the terminal 14 in receiving data from the entity 12, the entity can include a tag 12a capable of locally transmitting data to the terminal. The tag can comprise any of a number of different known tags capable of transmitting data in accordance with any of a number of different techniques. For example, the tag can be capable of transmitting data in accordance with techniques such as infrared, radio frequency, barcode and/or Bluetooth transfer techniques. Also, for example, the tag can be capable of transmitting data in accordance with Wireless Local Area Network (WLAN) techniques, such as IEEE 802.11 techniques or the like.

According to embodiments of the present invention, the terminal 14 can receive data from the entity 12, or more particularly the tag 12a. From the data, then, the terminal can then directly or indirectly identify the type of entity. In this regard, the entity can comprise any of a number of different types, where the type of entity is typically predefined for the entity. For example, entities such as cans of soup, boxes of cereal, soft drinks or the like can be identified as consumable goods. Also, for example, a number of different makes and models of printers or computers can be generally identified as printers or computers, respectively. Further, for example, paintings, maps or the like can be identified as images.

The data received from the entity 12 can comprise all or a portion of a description of the entity, including the type of entity. As will be appreciated, the data can include the description in any of a number of different formats, and include any of a number of different pieces of information in addition to the type of entity. For example, the data can comprise metadata including a description of the entity in a manner similar to a UpnP™ (universal plug-n-play) description.

As will be appreciated, however, in various instances the entity may not provide, or may not be capable of providing, all of the description of the entity from which the terminal can identify the type of entity. In such instances, the terminal 14 can perform a service discovery to retrieve at least a portion of the description of the entity. In this regard, the terminal can receive data from the entity 12, or more particularly the tag 12a, indicating at least a service discovery protocol, such as Service Location Protocol (SLP), Simple Service Discovery Protocol (SSDP), Lightweight Directory Access Protocol (LDAP), Hypertext Transfer Protocol (HTTP) or the like. In addition to indicating a service discovery protocol, the data received by the terminal can include an address, compatible with the service discovery protocol, that points to all or a portion of the description of the entity. For example, for HTTP, the data received by the terminal can include a uniform resource locator (URL) to a resource 16 that includes all or a portion of the description of the entity.

In addition to the description and/or pointer, in instances in which the entity 12 is connected to or otherwise associated with a network (e.g., network 18), the data can include network contact information associated with the entity. For example, presume the entity comprises a Bluetooth-enabled printer connected to a network that includes one or more local network access points. In such an instance, the data received from the printer can include data capable of identifying the printer, as well as contact information for the local network access point(s). As explained further below, then, the terminal can be capable of operating a printing application such that the terminal can drive the printer based upon the contact information for the local access point(s).

Figure 2:
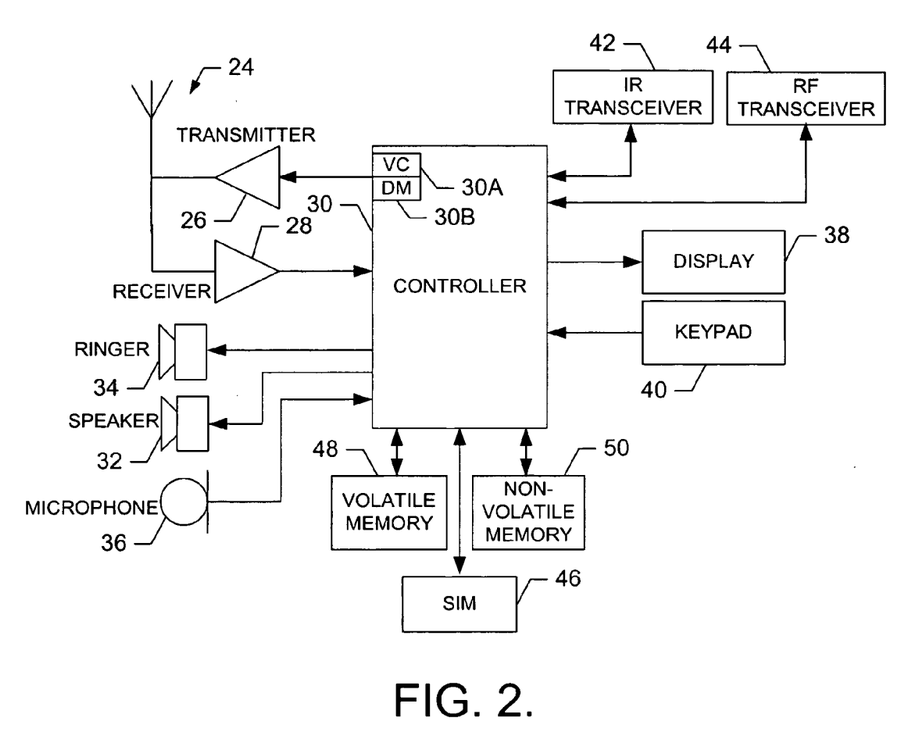
FIG. 2 is a schematic block diagram of a terminal comprising a mobile station, in accordance with one embodiment of the present invention.

Reference is now made to FIG. 2, which illustrates one type of terminal 14, a mobile station, that would benefit from embodiments of the present invention. It should be understood, however, that the mobile station illustrated and hereinafter described is merely illustrative of one type of terminal that would benefit from the present invention and, therefore, should not be taken to limit the scope of the present invention. While several embodiments of the terminals are illustrated and will be hereinafter described for purposes of example, other types of terminals, such as portable digital assistants (PDAs), pagers, and other types of electronic communications systems, can readily employ the present invention.

In addition, while several embodiments of the system and method of the present invention include a terminal comprising a mobile station, the terminal need not comprise a mobile station. In this regard, the terminal can comprise any of a number of other mobile processing devices, such as a laptop computer or the like, capable of operating according to embodiments of the present invention. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, the mobile station includes an antenna 24 for transmitting and receiving signals, such as to and from a base site or base station (not shown). The mobile station also includes a transmitter 26, a receiver 28, and a controller 30 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 30 includes the circuitry required for implementing the audio and logic functions of the mobile station. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 30A, and may include an internal data modem (DM) 30B. Further, the controller 30 may include the functionally to operate one or more software programs, which may be stored in memory (described below). For example, the controller may be capable of operating a connectivity program, such as a conventional Web browser. The connectivity program may then allow the mobile station to transmit and receive Web content, such as according to the Hypertext Transfer Protocol (HTTP) and/or the Wireless Application Protocol (WAP), for example.

The mobile station also comprises a user interface including a conventional earphone or speaker 32, a ringer 34, a microphone 36, a display 38, and a user input interface, all of which are coupled to the controller 50. The user input interface, which allows the mobile station to receive data, can comprise any of a number of devices allowing the mobile station to receive data, such as a keypad 40, a touch display (not shown) or other input device. In embodiments including a keypad, the keypad includes the conventional numeric (0-9) and related keys (#, *), and other keys used for operating the mobile station.

The mobile station can also include an infrared transceiver 42 or another local data transfer device so that data can be shared with and/or obtained from the entity 12, as well as from other devices such as other mobile stations, car guidance systems, personal computers and printers, if so desired. The sharing of data, as well as the remote sharing of data, can also be provided according to a number of different techniques. For example, the mobile station may additionally, or alternatively, include a radio frequency transceiver 44 capable of sharing data with other radio frequency transceivers, and/or with a Radio Frequency Identification (RFID) transponder tag, as such is known to those skilled in the art. Additionally, or alternatively, the mobile station may share data using Bluetooth brand wireless technology developed by the Bluetooth Special Interest Group. Although not shown, the mobile station may additionally or alternatively be capable of transmitting and receiving data according to a number of different wireless networking techniques, including WLAN techniques such as IEEE 802.11 techniques or the like. Further, the mobile station may include a barcode reader such that the mobile station may receive data according to barcode data transfer techniques.

The mobile station can further include memory, such as a subscriber identity module (SIM) 46, a removable user identity module (R-UIM) or the like, which typically stores information elements related to a mobile subscriber. In addition to the SIM, the mobile station can include other removable and/or fixed memory. In this regard, the mobile station can include volatile memory 48, such as volatile Random Access Memory (RAM) including a cache area for the temporary storage of data. The mobile station can also include other non-volatile memory 50, which can be embedded and/or may be removable. The non-volatile memory can additionally or alternatively comprise an EEPROM, flash memory or the like.

The memories 46, 48 and/or 50 can store any of a number of pieces of information, data or the like used by the mobile station to implement the functions of the mobile station. More particularly, the memories can store one or more applications capable of being executed and operated by the terminal 10 (e.g., mobile station). For example, the applications can include a printing application capable of directing a printer to print an image. The applications can also include a payment application capable of transferring funds, such as credit card funds, to an entity capable of receiving the funds. In addition, the applications can include an E-mail application capable of sending and receiving messages that may include text, images, audio, video and/or other multimedia. Further, the applications can include a controller application capable of controlling an actuator local to, and/or remote from, the terminal For example, the controller application can comprise a door opening/locking application capable of controlling an electronic door lock to change the state of a door from locked to unlocked, or from unlocked to locked.

In addition, for example, the applications can include an application browser and launcher (hereinafter referred to as an "application launcher"). As will be appreciated by those skilled in the art, the application launcher is capable of directing the controller 50 to execute another application stored in memory based upon a type of entity. To facilitate the application launcher in directing the controller to execute another application based upon a type of entity, the memories can further store associations for one or more applications with one or more types of entities. The applications are typically embodied in software, but as will be appreciated, one or more applications can alternatively be embodied in firmware, hardware or the like. As will also be appreciated, the applications described above are but a number of example applications, and as such, should not be taken to limit the number or types of applications capable of being executed by the terminal.

As explained in the background section, many conventional computing systems are capable of presenting a Graphical User Interface (GUI) that can be navigated using a pointing device, such as a mouse, trackball, touchpad, or touch screen. In this regard, the pointing device can be utilized to select to an object presented on a display screen, and to perform one or more actions based upon that object. Like conventional computing systems, the terminal 14 of embodiments of the present invention is capable of making selections and performing one or more actions based upon the selections. Unlike conventional computing systems, however, the terminal of embodiments of the present invention is capable of interacting with physical entities with a "point-and-click" style of user interface for ubiquitous computing applications. In this regard, the terminal generally permits users to select real-world, physical entities, identify a type of the entity, and perform one or more actions based upon the type of entity.

Figure 3:
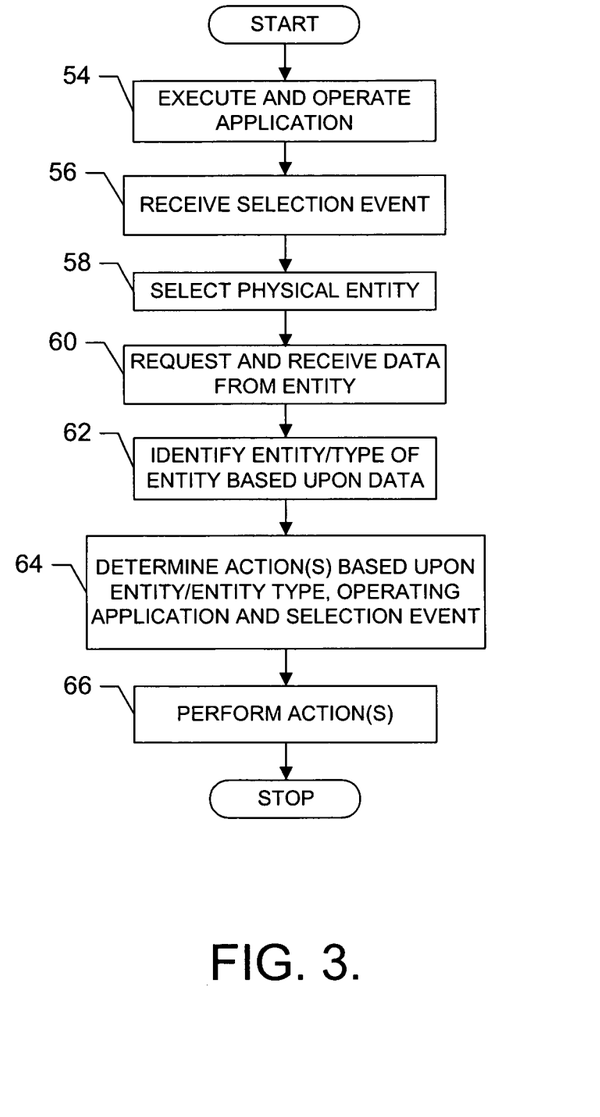
FIG. 3 is a flowchart illustrating various steps in a method of interacting with a physical entity according to one embodiment of the present invention.

Reference is now made to FIG. 3, which illustrates various steps in a method of interacting with an entity 12 in accordance with an embodiment of the present invention. As shown in block 54, the method generally includes executing and operating an application at the terminal 14. The application can comprise any of a number of different types of applications capable of being operated by the terminal, where the applications are also typically stored in memory of the terminal. For example, the application can comprise a printing application, a payment application, an E-mail application, a controller application or an application launcher, each of which are described above. As will be appreciated, in various instances, the terminal may execute and operate more than one application. In such instances, however, the terminal is typically only capable of actively operating one of the operating applications. Thus, as described herein, in instances in which the terminal is operating more than one application, the actively operating application is typically considered the operating application.

As the terminal 14 operates the application, the terminal can receive a selection event, as shown in block 56. The selection events can comprise any of a number of different well known selection events. In this regard, in conventional operating systems, such as Microsoft Windows, a pointing device can be utilized to point to an object presented on a display screen, and a left button of the pointing device can be clicked once to select the object. Such a selection event is typically referred to as "select." Then, again in conventional operating systems, once the object has been selected, the left button can again be clicked (or two clicks in succession) to execute or initiate an application associated with the object. Such an action is typically referred to as "select and open." For objects that include or are otherwise associated with content, however, the left button can be clicked (or two clicks in succession) to execute an application associated with the type of object and read the content of the object into the associated application.

Alternatively, a right button of the pointing device can typically be clicked to present a menu of one or more context-sensitive actions capable of being performed based upon the selected object. By presenting the menu of actions, the computing system can receive a selection of an action, such as from a user utilizing the pointing device, and thereafter perform the selected action. This event is typically referred to as "select and get information." Further, in conventional operating systems, such as Microsoft Windows, once an object is selected, the left button can be pressed and held down to drag or otherwise move the selected object and place or drop the selected object over another object presented on the display. In such instances, the left button can be released upon placing the selected object over another object to execute an alternative application other than the application associated with the selected object. Thereafter, the content of the selected object can be read into the alternative application associated with the other object. This event is typically referred to as "select drag and drop."

Like in conventional operating systems, the terminal 10 of embodiments of the present invention can receive selection events such as "select," "select and open," "select and get information," and/or "select drag and drop." As will be appreciated, the terminal can receive a selection event in any of a number of different manners. For example, the terminal can receive a "select" selection event by selecting an entity, as described below. Alternatively, for example, the terminal can receive a selection event by selecting an entity, such as in the same manner as receiving the "select" selection event, and thereafter receiving user input to a user interface (e.g., keypad 40) indicating the selection event as "select and open," "select and get information," or "select drag and drop."

Further, for example, the terminal 10 can receive a selection event by selecting an entity, and thereafter further interacting with the same or another entity 12. In this regard, the terminal can receive the selection event "select drag and drop" by selecting a first entity, and thereafter selecting another, second entity. Alternatively, the terminal can receive the selection event "select drag and drop" by selecting a first entity, and thereafter selecting an alternative application other than the application associated with the respective type of entity. The type of the first entity can then be at least temporarily associated with the alternative application (e.g., the application associated with the second entity or the selected application).

Irrespective of the selection event, receiving a selection event typically includes the terminal 10 selecting an entity 12, as shown in block 58. Although the physical entity can be selected in any of a number of different manners, in one embodiment, the entity is selected by initiating communication with the entity to thereby receive data from the entity. In this regard, the terminal can initiate contact with the entity in any of a number of different manners, but when the entity includes an RFID transponder tag 12a, the terminal can initiate contact by passing the terminal within a predefined distance of the RFID tag and receiving an instruction from a user, such as via a user interface of the terminal, to initiate contact with the entity.

After selecting the entity 12, the terminal 14 can receive data from the entity, as shown in block 60. The terminal can receive the data in any of a number of different manners, such as via radio frequency transfer from an RFID transponder tag 12a. In this regard, the terminal 14 can send a request to the RFID tag for data from the RFID tag, and thereafter receive data from the RFID tag. Although the terminal receives data from an RFID tag in one exemplar embodiment, it should be understood that the terminal can receive the data from the entity with or without the tag in any of a number of different manners, such as via infrared, radio frequency, barcode and/or Bluetooth transfer techniques.

As shown in block 62, after receiving the data, the terminal 14 can identify the type of entity based upon the data. The terminal can directly identify the type of entity from a description of the entity included in the data. Alternatively, the terminal can indirectly identify the type of entity from a description of the entity received from a resource 16 in accordance with a service discovery. In this regard, as explained above, the data can indicate a service discovery protocol and include an address pointing to all or a portion of the description of the entity. For example, for HTTP, the data received by the terminal can include a uniform resource locator (URL) to a resource 16 that includes all or a portion of the description of the entity.

Irrespective of how the terminal 14 identifies the type of entity, once the terminal has identified the type of entity, the terminal can determine one or more actions to be performed based upon the identified type of entity, the application operating on the terminal and the selection event, as shown in block 64. In addition, the terminal can determine one or more actions to be performed based upon a status of the application operating on the terminal. Thereafter, the terminal and/or the application operating on the terminal can perform the determined action(s), as shown in block 66. As will be appreciated, when the selection event comprises "select," the terminal typically awaits reception of another selection event regarding the selected entity 12, or otherwise awaits reception of an action to be performed regarding the selected entity such as via user input. Generally, then, when the selection event comprises "select," the terminal can determine the action(s) to be performed by awaiting reception of one or more action(s), and thereafter determining the action(s) to be performed based upon the received action(s). Otherwise, the terminal can determine the action(s) to be performed based upon the selection event, such as when the selection event comprises "select and open," "select and get information" and "select drag and drop."

Figure 4A:
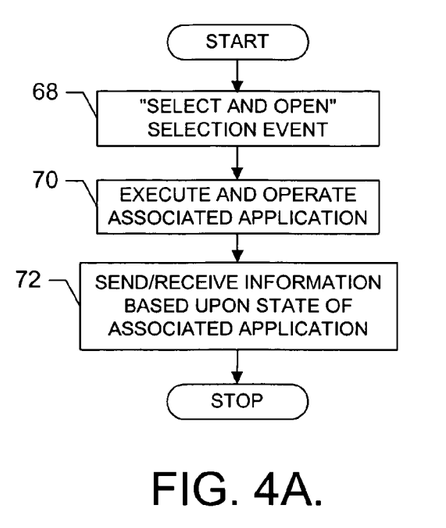
FIGS. 4A, 4B and 4C are flowcharts illustrating, more particularly, various steps in the method of FIG. 3, according to one embodiment of the present invention.

More particularly, for example, presume four entities 12 comprise a printer associated with a printing application, a painting having an image entity type that is associated with a photo editing application, an electronic door lock associated with a door opening/locking application, and an electronic device, such as another terminal, having a communication device entity type that is associated with a communications application, such as an infrared, radio frequency, barcode and/or Bluetooth communications application. With reference to FIG. 4A, in various instances when the application launcher is operating on the terminal 14, the selection event comprises "select and open," as shown in block 68. In such instances, the terminal typically determines and performs the action of executing and operating an application associated with the entity type of the selected entity 12, as shown in block 70. Thus, when the selected entity comprises the printer and the selection event comprises "select and open," the terminal can determine and thereafter perform the action of executing and operating the printing application associated with the selected printer, where the printing application can be operated in a state of receiving information, such as to print such information. But when the selected entity comprises the electronic device, the terminal can determine and thereafter perform the action of executing and operating the communications application, such as to initiate communication with the electronic device.

In various other instances when the application launcher is operating on the terminal 14 and the selection event comprises "select and open," the terminal can continue to operate the associated application to perform an application-specific operation. For example, the terminal can continue to operate the associated application to send and/or receive information based upon a state of the associated application, as shown in block 72. Thus, when the selected entity comprises the painting and the selection event comprises "select and get open," the terminal can determine and thereafter perform the actions of executing and operating the photo editing application in a state of receiving information. Thereafter, the terminal can also read an image of the painting into the photo editing application. In this regard, the image of the painting can be included in the description of the entity, received in data from the entity (e.g., tag 12*a*) or from a service discovery technique, both of which are described above.

When the selected entity 12 comprises the electronic door lock and the selection event comprises "select and open," the terminal 14 can determine and thereafter perform the action of executing and operating the door opening/locking application in a state of sending data, such as an electronic key. Thereafter, the terminal can operate the door opening/locking application to send the electronic key to the electronic door lock to thereby change the state of the electronic door lock (e.g., locked to unlocked, or vice versa). And when the selected entity comprises the electronic device, the terminal can determine and thereafter perform the action of executing and operating the communications application in a state of either receiving or sending information. If the communications application is in a state of receiving information, the terminal can operate the communications application to receive information from the electronic device, such as information presented on a display of another terminal. However, if the communications application is in a state of sending information, the terminal can operate the communications application to send information to the electronic device, such as information presented on a display of the terminal.

Figure 4B:
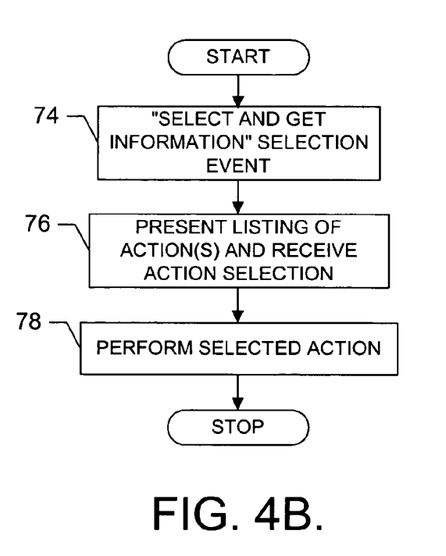

With reference to FIG. 4B, in various instances, the application launcher is operating on the terminal 14, the selection event comprises "select and get information," as shown in block 74 of FIG. 4B. In such instances, the terminal typically presents, on a user interface (e.g., display 38), a listing of one or more actions that relate to the selected entity 12 or respective entity type and that are capable of being performed, as shown in block 76. The listing of action(s) can be determined in any of a number of different manners. For example, the listing of action(s) can be determined based upon the respective entity type, and action(s) that relate to the selected entity and that are capable of being performed by applications capable of operating on the terminal. The action(s) can likewise comprise any of a number of different actions capable of being performed by the terminal, or more particularly the application operating on the terminal. For example, the action(s) can comprise opening an application associated with the respective entity type, presenting or otherwise operating on various pieces of data (e.g., within the application associated with the respective entity type) received from the selected entity or from a service discovery technique, and/or receiving a selection of and opening an alternative application other than that associated with the respective entity type.

After presenting the listing of action(s), the terminal 14 can receive a selection of an action from the listing, as also shown in block 76. In this manner the terminal can be considered to be "getting information," after having "selected" the entity 12. After receiving the action selection, the terminal can perform the selected action, as shown in block 78. For example, when the selected entity 12 comprises the electronic door lock and the selection event comprises "select and get information," the terminal 14 present a listing of action(s) including locking the electronic door lock and unlocking the electronic door lock. In such an instance, when the application launcher is operating on the terminal, the terminal can receive a selection of locking or unlocking the electronic door lock, and thereafter execute and operate the door opening/locking application to send the electronic key to the electronic door lock to thereby lock or unlock, respectively, the electronic door lock.

Also, for example, when the selected entity 12 comprises the painting and the selection event comprises "select and get information," the terminal 14 can present a listing of action(s) including presenting an image of the painting, printing an image of the painting and sending an image of the painting (via, e.g., E-mail). In such an instance, when the application launcher is operating on the terminal, the terminal can receive a selection of presenting an image of the painting, and thereafter execute and operate a photo editing application to present the image. Alternatively, the terminal can receive a selection of printing an image of the painting, and thereafter operate a printing application to thereby print the image. Further, the terminal can receive a selection of sending an image of the painting, and thereafter operate a communications application (e.g., E-mail application), to thereby send the image to one or more designated recipients.

Figure 4C:
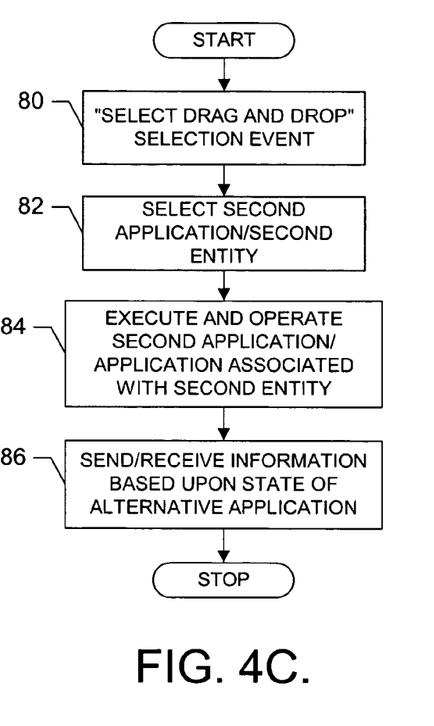

With reference to FIG. 4C, in various other instances, the application launcher is operating on the terminal 14, and the selection event comprises "select drag and drop," as shown in block 80. In such instances, the terminal can determine and perform the action of selecting, or otherwise receiving a selection of, a second application comprising an alternative application other than an application associated with the selected, first entity 12, as shown in block 82. Alternatively, the terminal can determine and perform the action of selecting, or otherwise receiving a selection of, a second entity associated with an alternative application. The terminal can then execute and operate the alternative application, whether the second application or the application associated with the second selected entity, as shown in block 84. Thereafter, the terminal can operate the alternative application to send and/or receive information based upon a state of the alternative application, as shown in block 86.

For example, presume that the selection event comprises "select drag and drop," the selected first entity 12 comprises the painting and that, in receiving the selection event, the terminal selected a second entity comprising the printer. In such an instance, the terminal 14 can determine and thereafter perform the action of executing and operating the printing application (i.e., alternative application) in a state of receiving information. The terminal can thereafter read an image of the painting into the printing application, such as to print the image.

As another example, presume that the selected first entity 12 comprises an electronic door lock and that, in receiving the selection event, the terminal 14 selected a second entity comprising the electronic device. The terminal can then determine and thereafter perform the actions of executing and operating the communications application in the same state as the door opening/locking application, which typically operates in a state of sending information (i.e., an electronic key). Thus, the terminal can determine and perform the actions of executing and operating the communications application to send the electronic key from the door opening/locking application to the electronic device, which can thereafter utilize the electronic key, such as to perform the same functions with a similar door opening/locking application on the electronic device.

As described above, when the application launcher is operating on the terminal 14, the terminal is capable of selecting a first entity 12, and thereafter selecting a second, alternative application or a second entity associated with an alternative application. It should be understood, however, that the terminal can be capable of only interacting with a second entity to perform the selection event "select drag and drop." In this regard, the terminal can be capable of selecting content stored in memory of the terminal, where the content is associated with an application. Then, the terminal can be capable of selecting, or receiving a selection of, an entity associated with an alternative application other than the application associated with the content. The terminal can thereafter execute and operate the alternative application, and read the selected content into the alternative application.

As will be appreciated, the terminal 14 can execute and operate an application associated with an entity type of the selected entity 12, as opposed to the application launcher. In such instances, the terminal can determine and perform actions similar to those determined and performed when the application launcher is operating on the terminal, particularly when the selection event comprises "select and open." In contrast to instances in which the application launcher is operating, however, the terminal need not execute the associated application, as the associated application is already operating on the terminal.

In various other instances, an alternative application other than an application associated with an entity type of the selected entity 12 is operating on the terminal 14. In these instances, the terminal can determine and perform actions based upon the selection event and consistent with the alternative application. For example, presume that the selected entity comprises the painting (associated with the photo editing application) and that the printing application (alternative application) is operating on the terminal, where the printing application is operating in a state of receiving information. When the selection event comprises "select and open," the terminal can determine and thereafter perform the action of reading an image of the painting into the printing application. When a conventional Web browser (alternative application) is operating on the terminal and in a state of receiving a URL of a Web page, however, the terminal can determine and thereafter perform the action of receiving a URL to a Web page including information regarding the painting, for example, and accessing a resource 16 to download the Web page. In this regard, the image of the painting and the ULR to the Web page including information regarding the painting can be included in the description of the entity, received in data from the entity (e.g., tag 12a) or from a service discovery technique.

As a more comprehensive example of an application of embodiments of the present invention, consider a "smart shopper" scenario where a consumer enters a store and shops for consumer goods, one or more of which are capable of transmitting data to the consumer's terminal, which comprises a mobile telephone. In this regard, when choosing a can of corn, the consumer, or more particularly the mobile telephone, selects the can to thereby receive information regarding the can of corn, such as the price, ingredients and other relevant information, whether from a tag affixed to the can of corn or from service discovery. When checking out, the consumer can be presented with an electronic bill, which the consumer can store in the mobile telephone and can pay by selecting a cash register, such as by pointing the mobile telephone at the cash register. Upon leaving the store, the consumer can unlock the door to the consumer's vehicle by selecting the vehicle, such as by pointing the mobile telephone at the vehicle. The consumer can further turn on the vehicle's engine by selecting an ignition switch in the vehicle. When the consumer arrives home, the consumer can print a copy of the bill (e.g., for their records) by selecting the bill stored in the mobile telephone, and dropping the stored bill on their home printer.

In the above scenario, each physical entity (i.e., the can of corn, cash register, vehicle lock, vehicle, ignition switch, printer) has an application associated with the entity (e.g., printer) or entity type (e.g., consumer good, funds receiving entity, lock, ignition switch) capable of being determined by the mobile telephone based upon data received from the entity upon selection. Upon determining the entity or entity type, the mobile telephone can execute an associated or alternative application capable of performing, or driving another application, actuator or the like, to perform a respective action. For example, upon determining the cash register comprises a funds receiving entity, the mobile telephone can execute a payment application capable of interacting with the cash register (e.g., "select and open"). Also, for example, upon determining the vehicle lock comprises an electronic lock, the mobile telephone can execute an appropriate application capable of controlling an actuator (via, e.g., infrared, radio frequency, barcode and/or Bluetooth transfer techniques) to unlock the vehicle lock. In addition, for example, upon selecting the bill stored on the mobile telephone, selecting the consumer's home printer and determining the entity type of the consumer's home printer (i.e., printer), the mobile telephone can execute a printing application capable of controlling the printer to print a graphic of the bill.

According to one aspect of the present invention, all or a portion of the system of the present invention, such as all or portions of the terminal 14, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3 and 4A-4C are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving, at an apparatus, an indication of a point-and-click user interface selection event via a pointing device pointed at a physical entity equipped with a tag, the tag being configured to communicate with the apparatus at least partially over an air interface,
      wherein the selection event is indicative of initiating communication with the physical entity equipped with the tag;
   receiving data from the tag, wherein the received data comprises contact information of a local network access point;
   identifying a type of the physical entity from the data received from the tag;
   identifying a list of one or more actions that relate to the physical entity that can be performed by at least one associated application of the physical entity, wherein the actions and applications are identified based on the type of the physical entity; and
   in response to receiving a selection of at least one action from the list of one or more actions, performing the at least one action, wherein performing the at least one action comprises initiating communication between the apparatus and the physical entity via the local network access point.

2. A method according to claim 1, wherein receiving data from the tag includes receiving the data from the tag via a radio frequency wireless communication connection and; wherein performing the at least one action further comprises sending information to the physical entity.

3. A method according to claim 1, further comprising:
   receiving user input identifying content stored in memory of the apparatus, the identified content being associated with an application other than the application associated with the identified type of the physical entity,
   and wherein performing the at least one action comprises executing and operating the application associated with the identified type of physical entity to receive the identified content.

4. A method according to claim 1, wherein receiving the indication of the selection event comprises receiving an indication of a drag-and-drop event, including receiving user input identifying an application other than the application associated with the identified type of physical entity to thereby indicate the drag-and-drop event, and wherein performing the at least one action comprises:
   executing the application other than the application associated with the identified type of physical entity; and
   operating the respective application to send or receive information relating to the physical entity.

5. The method of claim 1, wherein the contact information of the local network access point is transmitted from the tag via radio frequency identification.

6. The method of claim 1, wherein the contact information of the local network access point is transmitted from the tag in response to at least the apparatus passing within a predefined distance of the tag.

7. The method of claim 1, further comprising:
   receiving data on the apparatus from the physical entity via the local network access point.

8. The method of claim 1, wherein the at least one selected application is selected from different applications based on the type of the physical entity and wherein each of the different applications is associated with at least one entity type.

9. An apparatus comprising at least one processor and at least one memory including computer program code, the at least one memory and the computer program code configured to, with the at least one processor, cause the apparatus to at least:
   receive an indication of a point-and-click user interface selection event via a pointing device pointed at a physical entity equipped with a tag, the tag being configured to communicate with the apparatus at least partially over an air interface,
      wherein the selection event is indicative of initiating communication with the physical entity equipped with the tag, and
   receive data from the tag, wherein the received data comprises contact information of a local network access point;
   identify a type of the physical entity from the data received from the tag;
   identify a list of one or more actions that relate to the physical entity that can be performed by at least one associated application of the physical entity, wherein the actions and applications are identified based on the type of the physical entity;
   in response to receiving a selection of at least one action from the list of one or more actions, perform the at least one action, wherein being caused to perform the at least one action comprises initiating communication between the apparatus and the physical entity via the local network access point.

10. An apparatus according to claim 9, wherein the apparatus caused to receive the data from the tag includes receiving the data from the tag via a radio frequency wireless communication connection and; wherein the apparatus is further caused to send information to the physical entity.

11. An apparatus according to claim 9, wherein the at least one memory is configured to store content, and wherein the apparatus being caused to receive user input identifying content stored in the at least one memory, the identified content being associated with an application other than the application associated with the identified type of the physical entity,
   and wherein the apparatus being caused to perform at least one action includes being caused to execute and operate the application associated with the identified type of the physical entity to receive the identified content.

12. An apparatus according to claim 9, wherein the apparatus being configured to receive the indication of the selection event includes being configured to receive an indication of a drag-and-drop event, including being configured to receive user input identifying an application other than the application associated with the identified type of physical entity to thereby indicate the drag-and-drop event, and wherein being configured to perform the at least one action includes being configured to:

execute the application other than the application associated with the identified type of physical entity; and operate the respective application to send or receive information relating to the physical entity.

13. A computer program product comprising a non-transitory computer-readable storage medium having computer-readable program code portions stored therein, the computer-readable program code portions comprising:

a first executable portion configured to receive, at an apparatus, an indication of a point-and-click user interface selection event via a pointing device pointed at a physical entity equipped with a tag, the tag being configured to communicate with the apparatus at least partially over an air interface, wherein the selection event is indicative of initiating communication with the physical entity equipped with the tag, and a second executable portion configured to receive data from the tag, wherein the received data comprises contact information of a local network access point;

a third executable portion configured to identify a type of the physical entity from the data received from the tag;

a fourth executable portion configured to identify a list of one or more actions that relate to the physical entity that can be performed by at least one associated applications of the physical entity, wherein the actions and applications are identified based on the type of the physical entity; and a fifth executable portion configured to, in response to receiving a selection of at least one action from the list of one or more actions, perform the at least one action, wherein performing the at least one action comprises initiating communication between the apparatus and the physical entity via the local network access point.

14. A computer program product according to claim 13, wherein the second executable portion configured to receive the data from the tag includes being configured to receive the data from the tag via a radio frequency wireless communication connection and; wherein the at least one action further comprises sending information to the physical entity.

15. A computer program product according to claim 13, wherein the first executable portion is further configured to receive user input identifying content stored in memory of the apparatus, the identified content being associated with an application other than the application associated with the identified type of the physical entity, and wherein the fifth executable portion being configured to perform the at least one action includes being configured to execute and operate the application associated with the identified type of the physical entity to receive the identified content.

16. A computer program product according to claim 13, wherein the first executable portion being configured to receive the indication of the selection event includes being configured to receive an indication of a drag-and-drop event, including being configured to receive user input identifying an application other than the application associated with the identified type of physical entity to thereby indicate the drag-and-drop event, and wherein the fourth executable portion being configured to perform the at least one action includes being configured to:

execute the application other than the application associated with the identified type of physical entity; and operate the respective application to send or receive information relating to the physical entity.

\* \* \* \* \*